May 7, 1946.  C. O. EKLUND  2,399,727
CUTTING TOOL
Filed Sept. 8, 1943  2 Sheets-Sheet 1
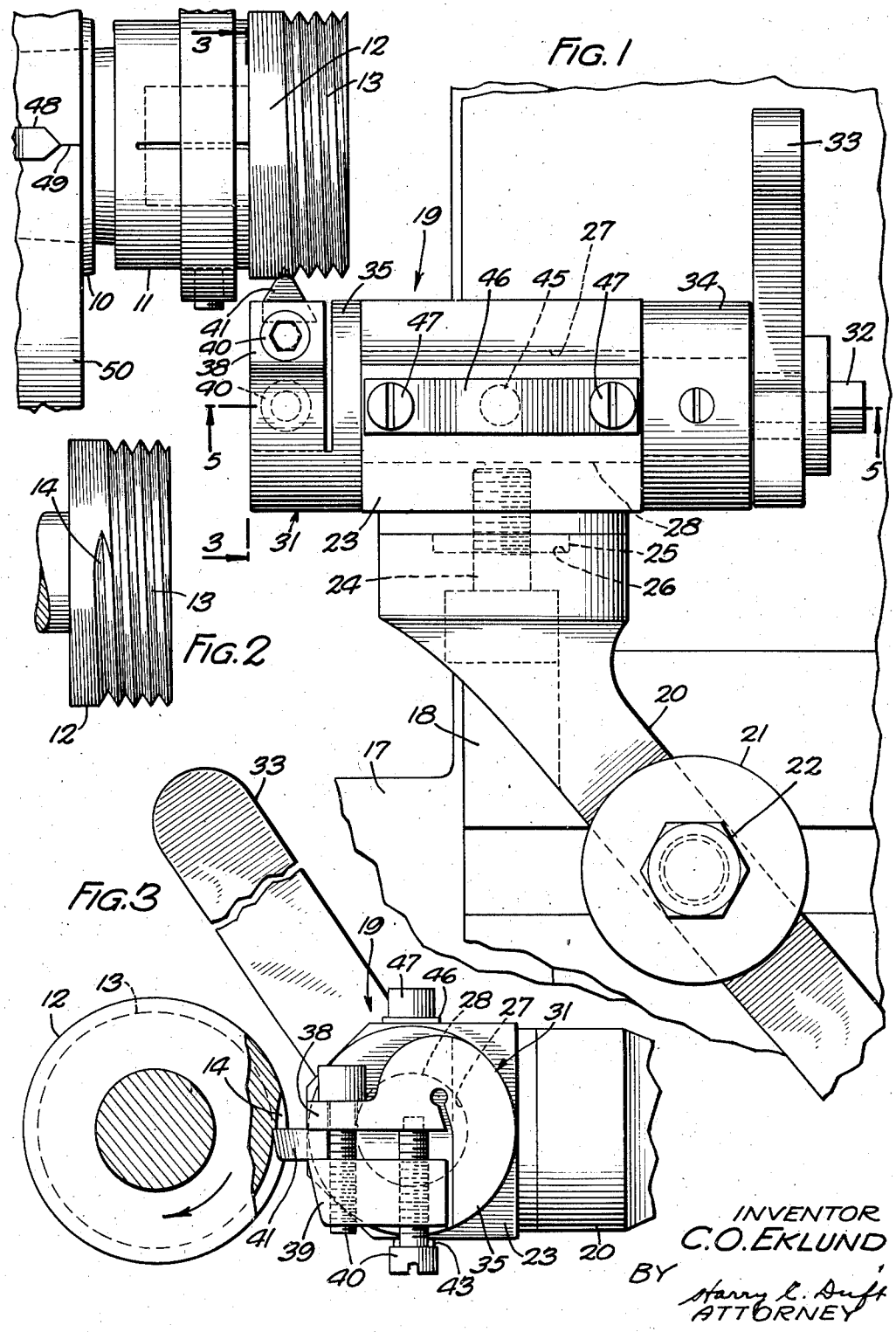
INVENTOR
C.O. EKLUND
BY
Harry L. Duft
ATTORNEY May 7, 1946.　　　C. O. EKLUND　　　2,399,727
CUTTING TOOL
Filed Sept. 8, 1943　　　2 Sheets-Sheet 2
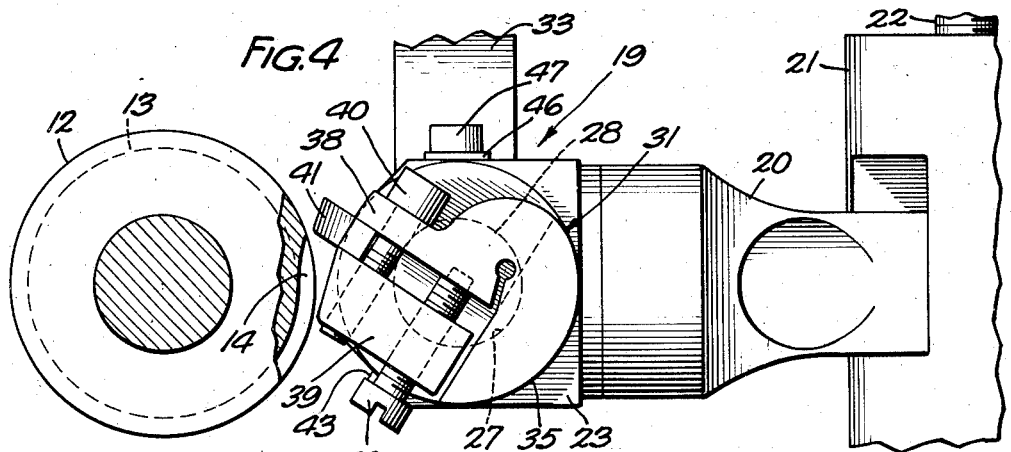
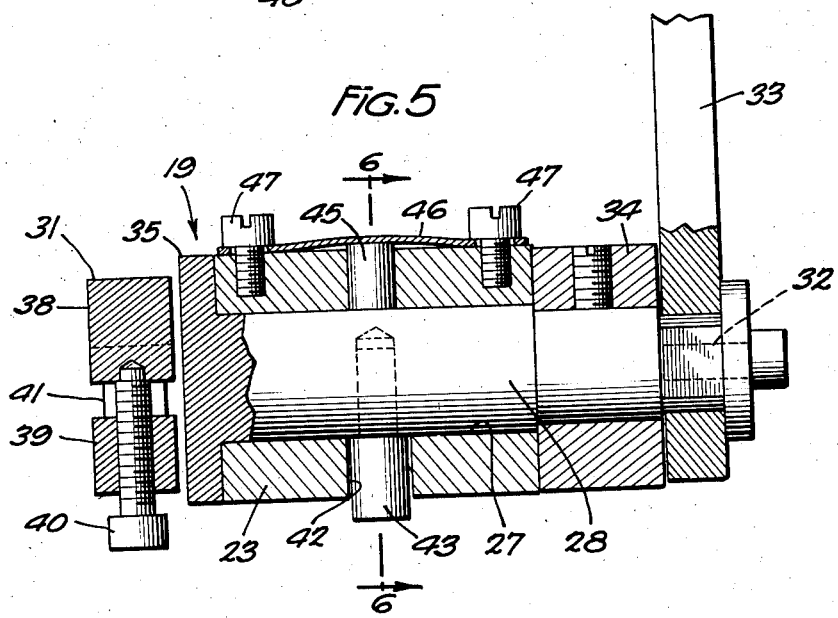
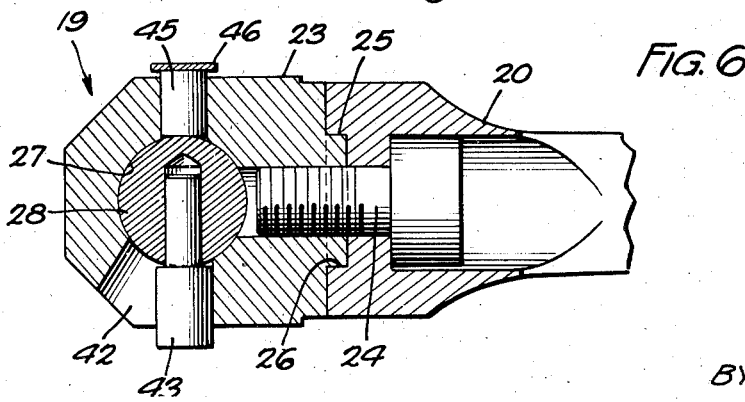
INVENTOR
C. O. EKLUND
BY
Harry L. Duft
ATTORNEY Patented May 7, 1946

2,399,727

UNITED STATES PATENT OFFICE 2,399,727

CUTTING TOOL

Carl O. Eklund, North Riverside, Ill., assignor to Western Electric Company, Incorporated, New York, N. Y., a corporation of New York Application September 8, 1943, Serial No. 501,550

1 Claim. (Cl. 82—5)

This invention relates to a cutting tool for uniformly forming and ending grooves in surfaces of articles and more particularly to a cutting tool for uniformly forming and ending screw threads in peripheral surfaces of circular articles where the threads do not extend to one end of the surface.

The invention is particularly useful in the cutting of screw threads, for example, exterior threads on articles, such as molding dies, a great number of which are used in a single machine for molding a plurality of internally threaded annular inserts for use in transmitter and receiver caps of telephone handsets. In such inserts, the threads do not extend to one end of the insert. In the molding of such threads, it is very desirable that the thread on each of the molding dies, in order to form similar threads on the molded inserts, should all terminate at the same point smoothly and uniformly so that the threads formed on the inserts will terminate in an identical manner and thus provide similar and interchangeable inserts.

An object of the invention is the provision of a cutting tool for accurately and economically, uniformly forming and ending screw threads on surfaces of articles where the threads do not extend to one end of the surface.

In accordance with the above object, in one embodiment of the invention, particularly designed for cutting and ending exterior threads on an article secured to a work rotating spindle of a lathe, there is provided a bearing box secured to a supporting arm adjustably clamped to a tool post carried on a cross slide, in turn carried on a main tool carrier for movement parallel to the axis of rotation of the spindle. Pivoted in the bearing box is a threading tool holder arranged and adapted to be oscillated through a predetermined arc so that in one position the tool is in cutting relation with the work and upon stoppage of the rotating work may be moved therefrom to complete the cut of the thread to provide a smooth and uniform end thereto.

Other objects and advantages of this invention will more fully appear from the following detailed description, taken in conjunction with the accompanying drawings, in which Fig. 1 is a plan view of a machine cutting tool and its mounting embodying the features of the invention as applied to a lathe and used for cutting exterior threads on molding dies, the lathe being shown fragmentarily;

Fig. 2 is a fragmentary view of a molding die having a thread cut and ended by the tool of this invention;

Fig. 3 is a vertical section taken on the line 3—3 of Fig. 1;

Fig. 4 is a view similar to Fig. 3 showing the position of the cutting tool after being actuated to end a thread;

Fig. 5 is a vertical longitudinal section taken on the line 5—5 of Fig. 1; and

Fig. 6 is a vertical section taken on the line 6—6 of Fig. 5.

Referring to the drawings and more particularly to Fig. 1, one embodiment of the invention is shown applied, for example, to a conventional type lathe shown fragmentarily, employing a single work piece rotating spindle 10, to which is attached a chuck 11, in which is gripped a work piece 12, the spindle and chuck being continuously rotated in the direction of the arrow (Fig. 3) in a manner well-known in the art. In the rotation of the work piece 12, a peripheral screw thread 13 is cut on an enlarged portion thereof, which, in the present disclosure, is a molding die, wherein the thread extends from the extreme right end of the enlarged die portion but not to its left end, the thread being of a predetermined length and similarly terminating in a smooth uniform tapering end, indicated at 14 (Figs. 2 and 4) in successively threaded articles. Fragmentarily shown at 17 is a main reciprocatory tool slide, which is movable parallel to the axis of the spindle 10. The slide 17 supports a reciprocatory cross slide 18, which is movable at right angles to the axis of the spindle 10. By mechanisms well-known in the art and constituting no part of this invention, the required movements of the slides 17 and 18 are effected to cut the thread 13 on the molding die 12.

A cutting tool and its mounting embodying the features of this invention and indicated, in general, at 19 is supported by means of a bar 20 from a tool post 21 mounted on the cross slide 18, the bar being retained in its adjusted position on the post by a screw 22. The cutting tool 19 comprises a bearing box or sleeve 23 of irregular contour (Fig. 6) attached by a clamping screw 24 to the bar 20. It will be understood that the tool 19 is set at an angle and clamped to the bar 20, as shown by the position of the tool in Fig. 5, to agree with the helix angle of the screw thread 13 to be cut in the molding die 12, the purpose of which is well understood in the art. Thus, to facilitate the aligning and retaining in position of the angularly adjusted abutting faces of the sleeve 23 and the bar 20, such faces are formed, respectively, with a circular boss 25 entered in a circular depression 26 in the bar. Pivoted in an aperture 27 extending parallel to the axis of the spindle 10 (Figs. 1 and 5) is a shouldered shaft or shank 28 of a threading tool holder 31 having secured at its right end, as shown at 32, a handle 33 for the purpose of oscillating the same. Interposed between the opposed faces of the handle 33 and the right end face of the sleeve 23 and secured to the shaft 28 is a collar 34, which, together with an integral head 35 on the left end of the shaft which abuts the left end face of the sleeve, serves to prevent displacement of the shaft longitudinally in the sleeve. The head 35 of the shaft 28 is formed at its outer end with integral spaced jaws 38 and 39, between which is clamped, by screws 40, a cutting blade 41, which is ground to the correct angle and clearance for the particular thread to be formed, the jaws being so formed and arranged on the head 35 that a certain desired yielding of the blade is permitted during the cutting operation. A slot 42 formed in the sleeve 23 (Figs. 5 and 6), and in which is entered a pin 43 carried by the shaft 28, serves to limit the oscillatory movement of the tool holder 31. When the cutting blade 41 is in operative engagement with the molding die, to be threaded (Figs. 1 and 3), the pin 43 is engaging the right hand end of the slot 42, as clearly shown in Fig. 6, and upon manually withdrawing the blade from the article by means of the handle 33 to the position shown in Fig. 4, the pin engages the left hand end of the slot. A pin 45 (Figs. 5 and 6) carried in an aperture in the sleeve 23, is constantly pressed at one end against the periphery of the shaft 28 by a spring 46 engaging its opposite end, which extends slightly outside the sleeve, the spring being fixed at opposite ends to the sleeve by screws 47. By means of the spring-pressed pin 45, the cutting blade 41, when withdrawn from the article 12 to the position shown in Fig. 4, will be retained thereat until manually moved back to its operative position. The thrust of the rotating molding die 12 on the blade 41 maintains the blade in its operative position (Fig. 3).

In the use of the screw thread cutting and ending tool 19 above described, it is to be understood that the thread 13 has been cut on the rotating molding die 12 in the usual manner by a plurality of successive cutting operations to the depth of thread shown in Fig. 3. Upon completion of each cut consisting of a sufficient length of thread or of substantially four and one-half threads, as viewed in Fig. 2, the operator stops the rotating spindle 10 carrying the molding die 12 at a predetermined point. To facilitate the stopping of the molding die 12 by the operator at the desired point, there may be provided a stationary indicator arm, fragmentarily shown at 48, and a mark or indicia 49 on a usual form of face plate 50 attached to the spindle 10. The stopping of the rotating spindle at the desired point is effected by first stopping the spindle 10 slightly before the moving indicia 49 reaches the stationary indicator arm 48 and in advance of the end of the thread 13 and, thereafter, manually rotating the spindle 10 by grasping the face plate 50 until the indicia is accurately aligned with the indicator arm. With this alignment of the indicator arm 48 with the indicia 49, the cutting blade 41 and the molding die 12 have reached the relative positions shown in Figs. 1 and 3.

Thereafter, the handle 33 is rocked in a clockwise direction, as viewed in Fig. 3, to its vertical position (Fig. 4), in which position the pin 43 carried by the shaft 28 engages the left-hand end of the slot 42 in the sleeve 33. The cutting blade 41 is, consequently, swung about an arc out of engagement with the thread 13 cut in the molding die which produces a clean, uniform tapering end 14 to the thread. It will be obvious that in forming threads 13 on successive molding dies 12 in the manner above described, that the threads on molded articles or inserts produced by the dies 12 when used simultaneously in a single molding machine will be similar in all respects.

It will be understood that the embodiment herein described is merely illustrative of the invention and one application thereof and that modifications can be made and it is capable of other applications.

What is claimed is:

In a cutting tool for a material working apparatus which includes means for moving a cutting tool slide relative to a work piece, a cutting tool for cutting a groove at a predetermined angle to the longitudinal axis of the work piece, a bearing, means for pivotally supporting said bearing on said slide for adjustment to a predetermined angle about an axis perpendicular to the longitudinal axis of the work piece and outside of the periphery of the work piece, an oscillatory support journalled in said bearing and having means for supporting said tool in cutting relation to the work piece, and means for limiting the oscillatory movement of said support in opposite directions whereby, upon movement thereof in one direction, the tool will operatively engage the work piece surface and, in an opposite movement thereof, the tool will be withdrawn from the groove along an arc opposite to the arc of the groove to complete the same and form a smooth uniform end to the groove, tapering off to the grooved surface of the work piece.

CARL O. EKLUND.